United States Patent
Favagrossa (10) Patent No.: US 10,479,330 B2
(45) Date of Patent: Nov. 19, 2019

(54) ROTARY BRUSH FOR WASHING SYSTEMS, PARTICULARLY FOR VEHICLES

(71) Applicant: FAVAGROSSA EDOARDO S.R.L., Roncadello di Casalmaggiore (IT)

(72) Inventor: Leonardo Favagrossa, Roncadello di Casalmaggiore (IT)

(73) Assignee: FAVAGROSSA EDOARDO S.R.L., Roncadello di Casalmaggiore (IT)

(*) Notice: Subject to any disclaimer, the term of this patent is extended or adjusted under 35 U.S.C. 154(b) by 308 days.

(21) Appl. No.: 15/446,912

(22) Filed: Mar. 1, 2017

(65) Prior Publication Data

US 2017/0253219 A1 Sep. 7, 2017

(30) Foreign Application Priority Data

Mar. 1, 2016 (IT) ................................ 10201621618

(51) Int. Cl.
*B60S 3/06* (2006.01)
*B60S 3/00* (2006.01)
(Continued)

(52) U.S. Cl.
CPC .............. *B60S 3/06* (2013.01); *A46B 5/0095* (2013.01); *A46B 9/005* (2013.01); *A46B 9/026* (2013.01); *A46B 13/006* (2013.01); *B60S 3/002* (2013.01)

(58) Field of Classification Search
CPC .......... B60S 3/06; B60S 3/002; A46B 5/0095; A46B 9/005; A46B 9/02; A46B 9/026; A46B 13/006; A46B 2200/3046
See application file for complete search history.

(56) References Cited

U.S. PATENT DOCUMENTS 3,871,046 A    3/1975   Takeuchi
6,279,190 B1 * 8/2001   Belanger .................. A46B 3/16
                                                           15/230.16
(Continued)

FOREIGN PATENT DOCUMENTS

DE           3601606 A1    7/1987
DE     202013103847 U1    9/2013

OTHER PUBLICATIONS

Italian Patent Application MI2008A000928 of May 2008.
(Continued)

*Primary Examiner* — Weilun Lo
(74) *Attorney, Agent, or Firm* — Jeffrey N. Townes; Cozen O'Connor (57) ABSTRACT

A rotary brush for automatic vehicle washing systems, said brush comprising a central unit (2) and a plurality of cleaning elements (3), operatively supported by and coupled to said central unit (2) through removable coupling means (7); the cleaning elements (3) being removable from said central unit (2) and it being possible to replace and/or remove them without requiring the removal of said central unit from the rotary structure; said central unit (2) comprises a rigid shaft (4) that supports a plurality of supporting elements (5) comprising a plurality of lugs (53) to which the cleaning elements (3) are fastened; the rotary brush is characterized in that said cleaning elements (3) comprise bands (33), fringed and fringeless, helically arranged on said central unit (2) in such a way that each band (33) is coupled to a plurality of supporting elements (5).

7 Claims, 10 Drawing Sheets

(51) Int. Cl.
*A46B 5/00* (2006.01)
*A46B 9/02* (2006.01)
*A46B 9/00* (2006.01)
*A46B 13/00* (2006.01)

(56) References Cited

U.S. PATENT DOCUMENTS

| | | | | |
|---|---|---|---|---|
| 6,289,544 | B1* | 9/2001 | Kirikian | A46B 13/003 |
| | | | | 15/230.14 |
| 2006/0207047 | A1* | 9/2006 | Weyandt | A46B 13/003 |
| | | | | 15/230.13 |
| 2008/0010769 | A1 | 1/2008 | Favagrossa | |
| 2010/0058549 | A1 | 3/2010 | Favagrossa | |
| 2011/0138558 | A1 | 6/2011 | Favaqgrossa | |
| 2014/0259727 | A1* | 9/2014 | Belanger | B60S 3/002 |
| | | | | 34/355 |

OTHER PUBLICATIONS

Machine translation of claims of Italian Patent Application MI2008A000928 of May 2008.
Italian Patent Office Search Report and Written Opinion dated Oct. 17, 2016 (partially in English).

\* cited by examiner

ROTARY BRUSH FOR WASHING SYSTEMS, PARTICULARLY FOR VEHICLES

The object of the present invention is a rotary brush for automatic vehicle washing systems.

As is known, automatic washing systems for motor vehicles comprise rotatory washing brushes generally constituted by a support, usually cylindrical and coupled to a rotating member.

A plurality of flexible cleaning elements are applied to the outer surface of the support, these being arranged side by side and perpendicularly connected at one end to the support.

The automatic washing and cleaning, for example, of the bodywork of a motor vehicle, is achieved by rotating a plurality of brushes of the above-described type in a manner such that the flexible elements, held in a predetermined configuration due to the centrifugal force generated by the rotation of the brushes, strike the bodywork after the interposition of water and/or opportune washing solutions or emulsions.

Up to now, the aforementioned cleaning elements are mostly made of polyethene, in the form of strands, or felt, in the form of belts or fringes.

In the first case, the free tip of each strand forming the brush is flattened, via a special process known as "feathering", widening it so that its impact pressure is spread over a larger surface and, at the same time, increasing the cleaning surface.

The tip has a certain roughness and porosity after such processing and, over time, minute stone or metal particles collected from previously cleaned surfaces become deposited on it, and these particles, becoming trapped in the aforementioned rough and porous parts, become encrusted, forming abrasive areas that can scrape the bodywork paint of washed vehicles, generating minute scratches.

Felt has optimal cleaning characteristics, but due to its high tendency to become impregnated with the liquids it comes into contact with, there is the drawback of a considerable increase in weight and consequent loss of the brush's balance generated by the brush's whirling motion.

The weight of the brushes causes significant increases in energy consumption, with greater wear on rotating parts and, in consequence, a greater number of faults on such systems.

To overcome these drawbacks, the applicant has proposed several structures for composite brushes of the type, for example, described in Italian Patents 1377405, 1375507, 1387590 and 1390967.

In particular, Italian Patent 1377405 describes a strip structure for rotary brushes for washing systems, particularly for vehicles, characterized in that it comprises an elongated sheet-like body in a relatively rigid flexible material that can be connected to a central support of a rotary brush; a relatively soft flexible element is connected to the free end of the more rigid sheet-like body.

The aforementioned strip structure, constituted by a relatively rigid base, which does not absorb water, and a sufficiently soft tip, enables having lighter brush units, with consequent energy savings and better washing uniformity.

Furthermore, this type of strip structure works more gently on the washed surfaces, consequently reducing vibration and therefore ensuring a longer life for the support bearings of the washing members.

The rigid base structure of the strip ensures that the brush is more uniform, even when not in rotation or in transitory phases, i.e. in the start and stop phases.

The felt tips of the strips enable efficient washing, but without the drawback of weight increase due to water absorption that afflicts strips made entirely of felt.

The task of the present invention is to create an improved rotary brush with respect to rotary brushes of the known art.

Within the scope of this task, one object of the invention is to create an improved brush from the production standpoint and that, in particular, enables speeding up the production processes.

Another object is to create an ecologically advantageous brush, which can be produced using less materials in the manufacturing phase and for spare parts, and which enables using recyclable materials.

A further object of the present invention is to provide a brush that is advantageous from the logistics standpoint, allowing volume savings when shipping and better packing for the material.

Another object is to create a functionally more efficient brush that does not leave washing/drying "gaps" on surfaces.

A further object of the present invention is to provide a brush that allows quick and easy cleaning, as well as, if required, the complete, quick and simple replacement of the parts most exposed to dirt and wear.

Another object of the invention is to create a brush that can be offered in various configurations.

Due to its distinctive characteristics, this brush is capable of ensuring the broadest guarantees of reliability and safety in use.

These and other objects, which shall be set forth in the following, are achieved by a rotary brush for automatic vehicle washing systems that comprises a central unit and a plurality of cleaning elements, operatively supported by and coupled to said central unit through removable coupling means; said cleaning elements are removable from said central unit and can be replaced and/or removed without requiring the removal of said central unit from the rotary structure; said central unit comprises a rigid shaft that supports a plurality of supporting elements comprising a plurality of lugs to which the cleaning elements are fastened; said rotary brush is characterized in that said cleaning elements comprise fringed and fringeless bands, arranged in a helical configuration on said central unit in such a way that each band is coupled to a plurality of supporting elements.

Further characteristics and advantages of the present invention will be explained in detail through examination of the description of a preferred, but not exclusive, embodiment of the invention, shown by way of non-limitative example in the accompanying drawings, in which.

With particular reference to the aforementioned figures, the rotary brush, according to the invention, indicated as a whole by reference numeral 1, comprises a central unit 2, which can be combined with a rotary structure, not visible in the figures, and a plurality of cleaning elements 3, coupled to said central unit 2 through removable coupling means 7.

According to the present invention, the central unit 2, once assembled on the rotary structure, shall not need to be dismantled in order to perform replacement and/or cleaning operations on the cleaning elements.

According to a first aspect of the invention, the central unit 2 is constituted by a rigid shaft 4 that supports a plurality of supporting elements 5, comprising a plurality of flexible and/or inflexible lugs 53, to which the cleaning elements 3 are fastened.

In this embodiment, the cleaning elements 3 are constituted by fringed and fringeless bands 31 arranged in a ring-line manner on the central unit, where each supporting element 5 supports a band 31.

The bands 31 are arranged in a circular manner and are independently fastened on each supporting element 5.

Each supporting element 5 comprises a clamping ring 52 and a plurality of undulated and/or not undulated lugs 53 to which the cleaning elements 3 are fastened.

The band 31 is connected to the end of the lug 53 by a hook-and-loop fastener 7, or any other removable coupling means, such as zips, buttons, clips, joints, etc.

Figure 1:
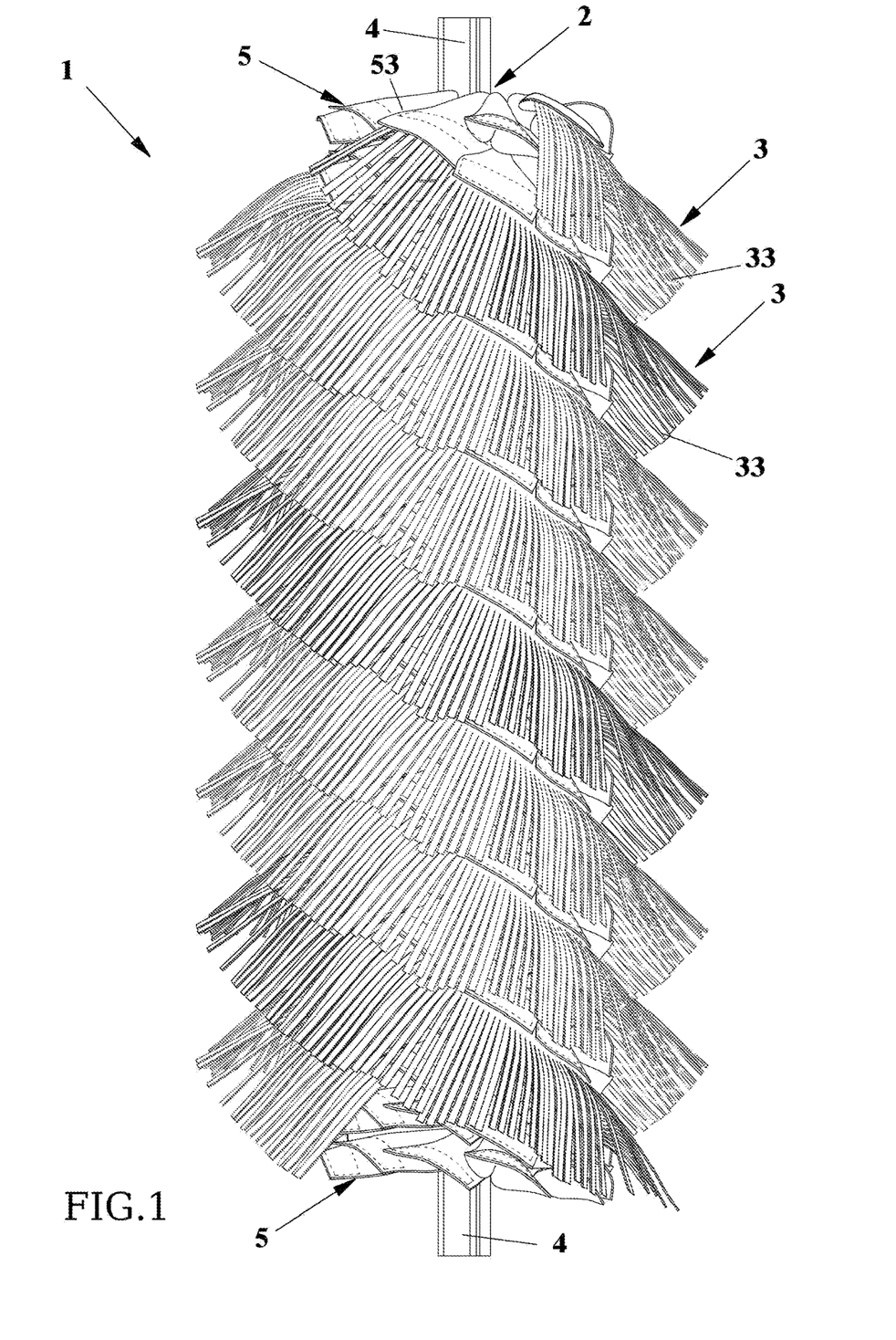
FIG. 1 is a perspective view of a helically-shaped rotary brush, shown in the assembled state, according to the present invention.
Figure 2:
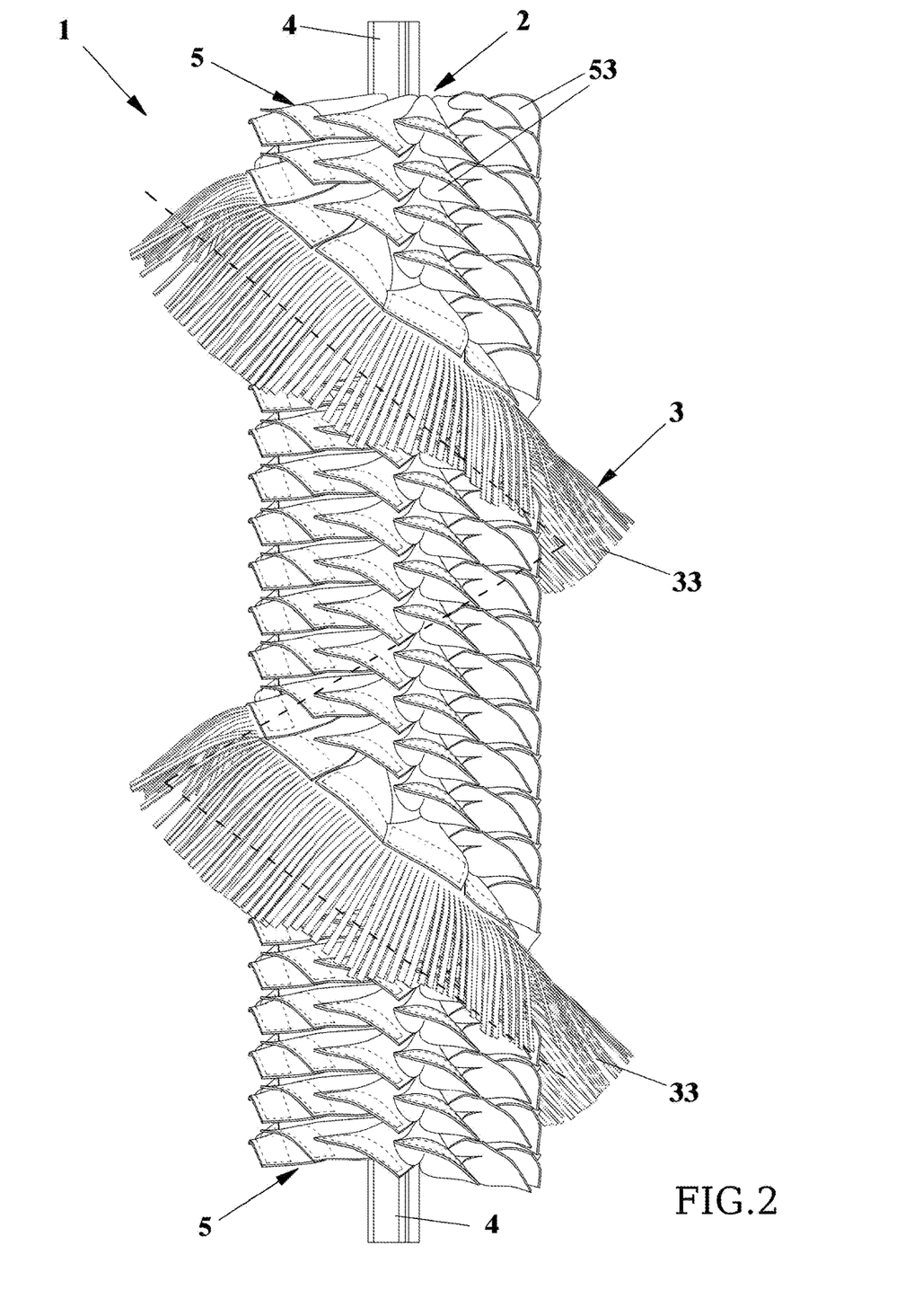
FIG. 2 is a perspective view, similar to the previous one, showing the brush with only one helical band applied.
Figure 3:
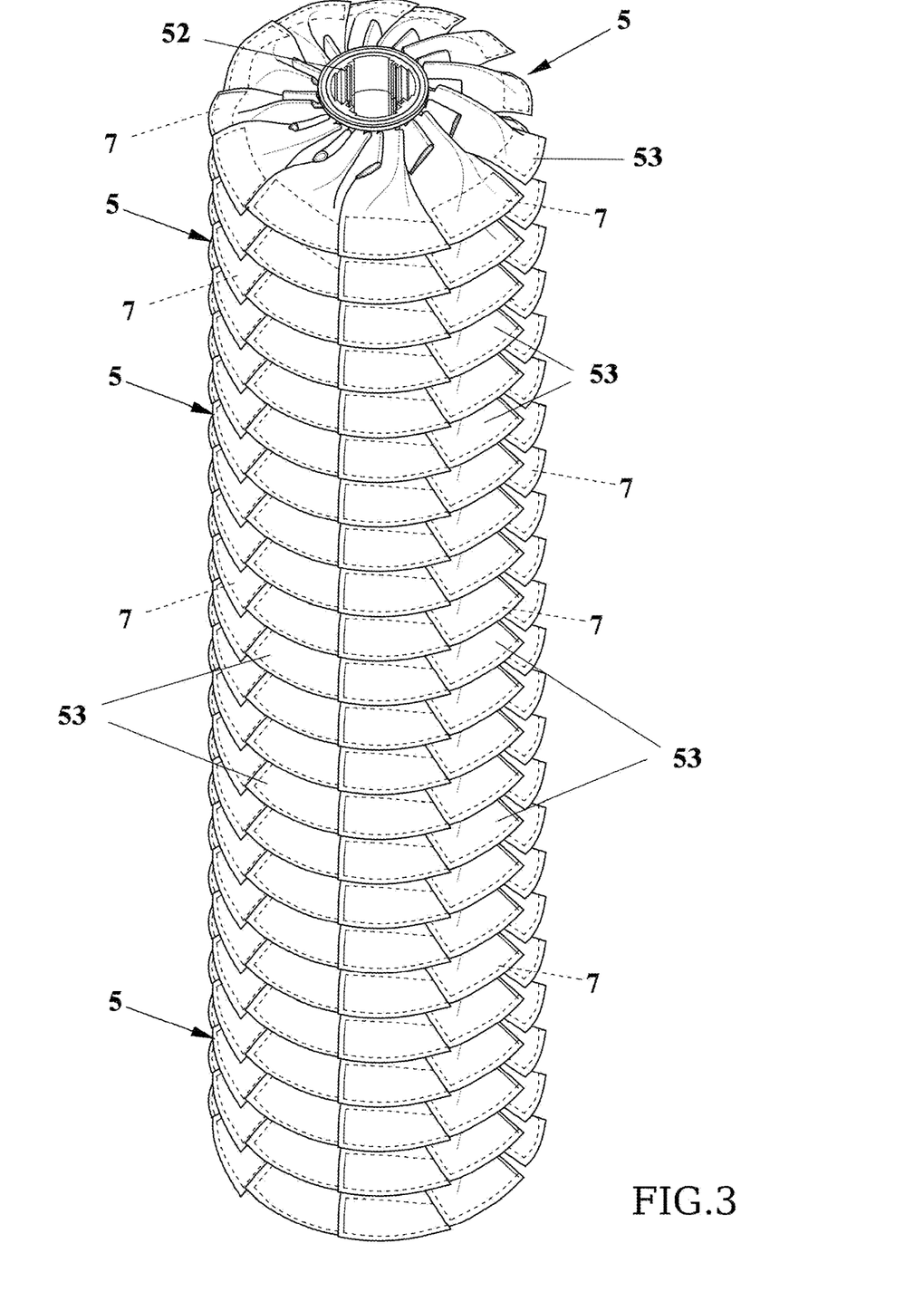
FIG. 3 is a perspective view showing the central support unit of the individual cleaning and/or drying and/or polishing elements of the brush of the present invention.
Figure 4:
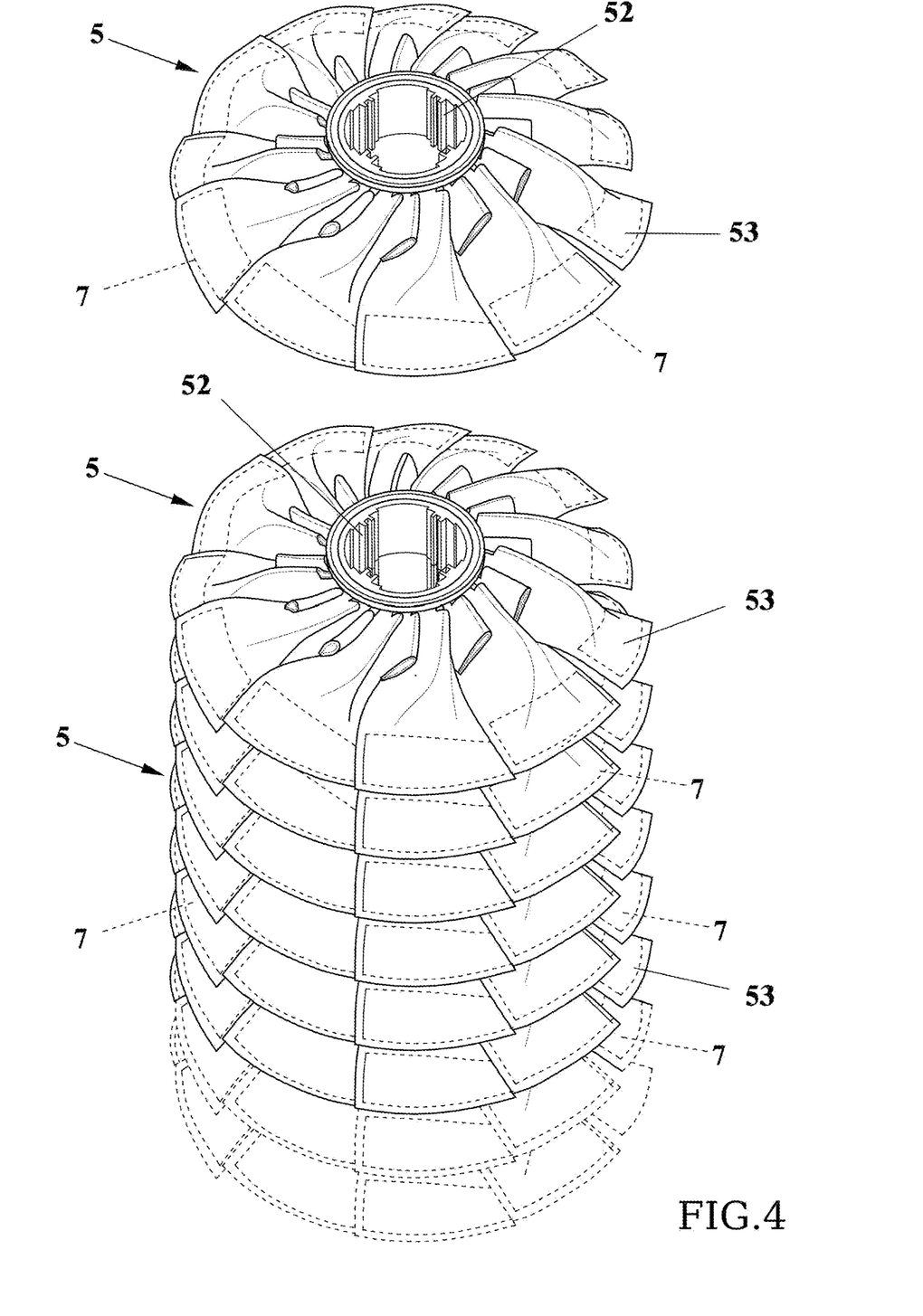
FIG. 4 is a partially exploded view showing the central unit.
Figure 5:
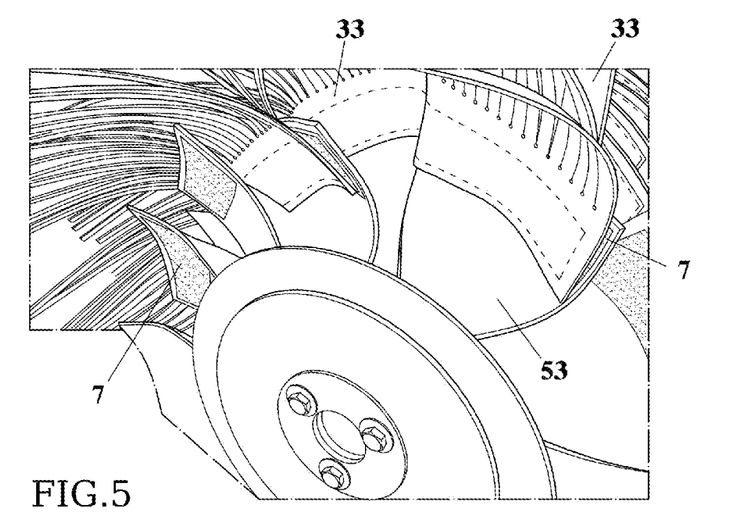
FIG. 5 is a perspective view, enlarged with respect to the previous ones, showing the removable means for coupling a band to the central unit in detail.
Figure 6:
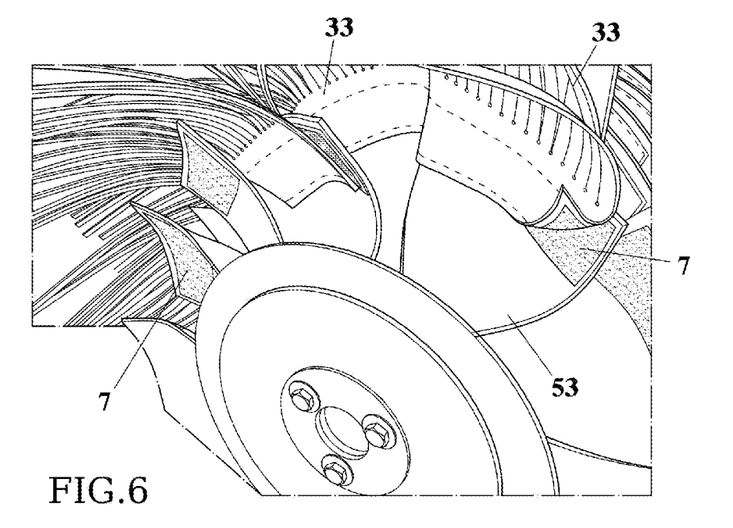
FIG. 6 is another perspective view, enlarged with respect to the previous ones, showing the removable means for coupling a band to the central unit in detail.
Figure 7:
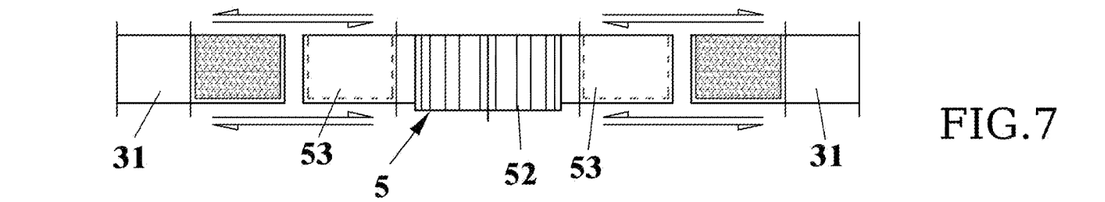
FIG. 7 shows an example of a band assembled on the casing.

FIG. 7 shows an example of assembly of the band 31 on the annular supporting element.

Figures 8, 9:
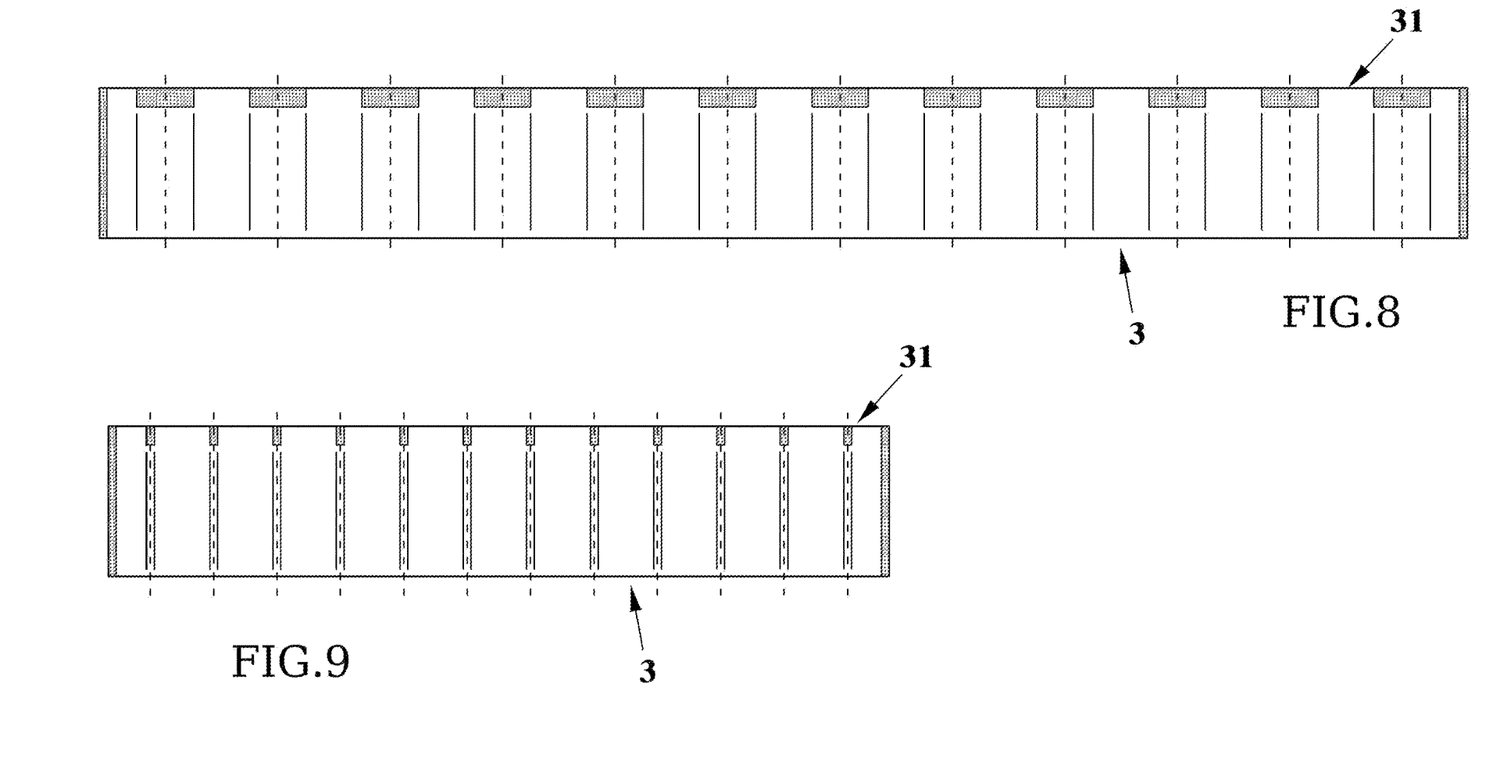
FIG. 8 shows the step of sewing hook-and-loop fastener and cutting the band of the structure shown in the previous figure to size.
FIG. 9 shows the step of sewing folded hook-and-loop fastener to obtain the pleats in the fabric of the structure in the previous figure.
Figure 10:
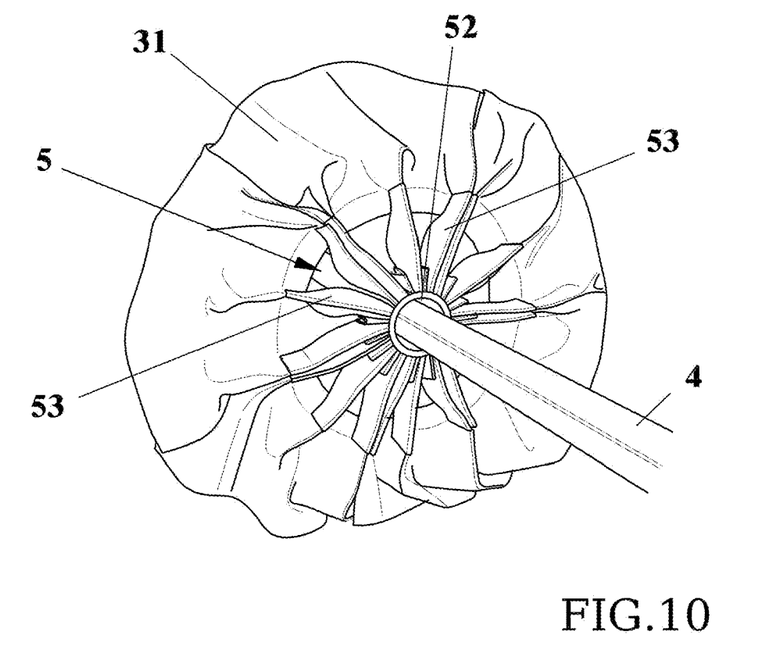
FIG. 10 is a perspective view of a ring-shaped rotary brush, shown in the assembled state, according to the present invention.
Figure 11:
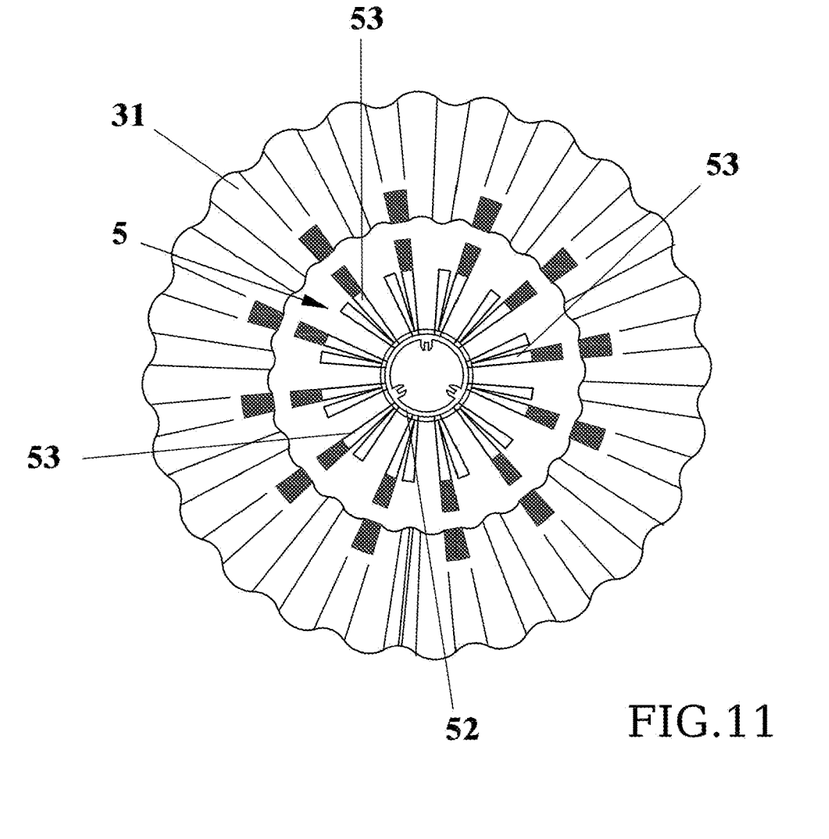
FIG. 11 is an exploded view, in plan, of the brush in FIGS. 7-10.
Figure 12:
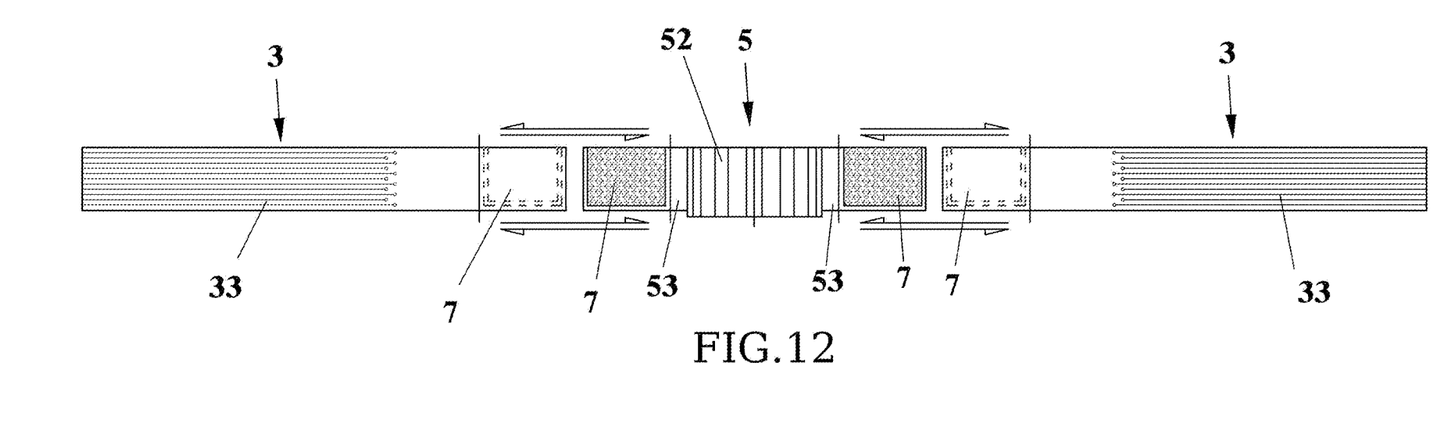
FIG. 12 is a partially exploded side-elevation view showing the structure constituted by a supporting element fitted with a plurality of flexible and/or inflexible lugs.

FIG. 8 shows the step of sewing hook-and-loop fastener and cutting the piece to size to form the band 31.

FIG. 9 shows the step of sewing folded hook-and-loop fastener to obtain the pleats in the fabric of the band 31.

This embodiment of the invention allows quickly and easily removing the part of the brush in direct contact with the surfaces, i.e. the actual cleaning elements 3, the most subject to dirt and wear, allowing them to be washed or immediately replaced without having to dismantle the central unit 2 and in an extremely rapid manner.

According to a further aspect of the invention, the central unit 2 is still constituted by a rigid shaft 4 that supports a plurality of supporting elements 5 comprising a plurality of lugs 53 to which the cleaning elements 3 are fastened.

In this embodiment, one or more bands are fastened to the supporting elements 5 in a helical configuration, so that each band 33 is coupled to a number of supporting elements 5.

Advantageously, the aforementioned supporting elements 5 can be obtained by moulding an opportune rigid plastic material.

This structure, which is shown in FIGS. 1, 2, 5, and 6, enables to considerably reducing the amount of material used and the production times of the shaft, as well as guaranteeing uniform washing quality over the entire washed or dried surface.

The helical structure also allows to quickly and easily remove the parts of the brush in direct contact with the surfaces, the most subject to dirt and wear, allowing them to be washed or immediately replaced without having to dismantle the central unit 2.

The special helical shape allows fitting an infinite variety of types of bristles constituted by expanded or non-expanded materials, closed or not closed-cell materials, felt, fabric, microfiber, laminated and coupled materials, etc., which can be assembled separately or intermixed with one another.

FIGS. 13-22 show various embodiments of the cleaning elements in bands 33.

Figure 13:
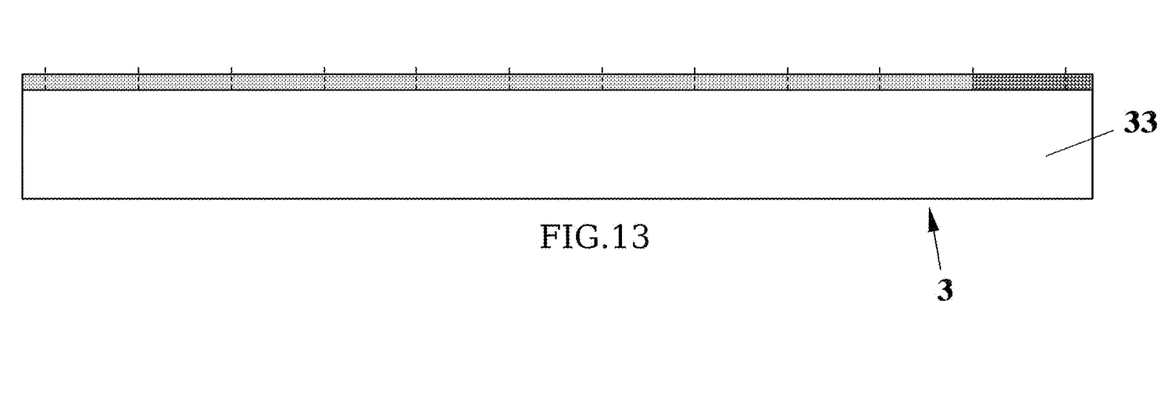
FIG. 13 shows a constant-height embodiment of the band.
Figure 14:
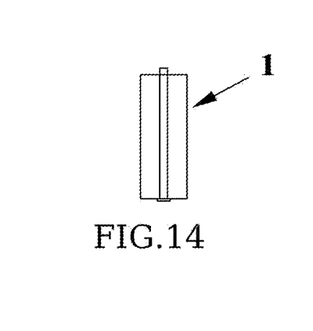
FIG. 14 is an elevation view that schematically shows the shape of the rotary brush fitted with the band in the previous figure.

FIG. 13 shows an embodiment of a constant-height band, while FIG. 14 schematically shows the shape of the rotary brush fitted with this band.

Figure 15:
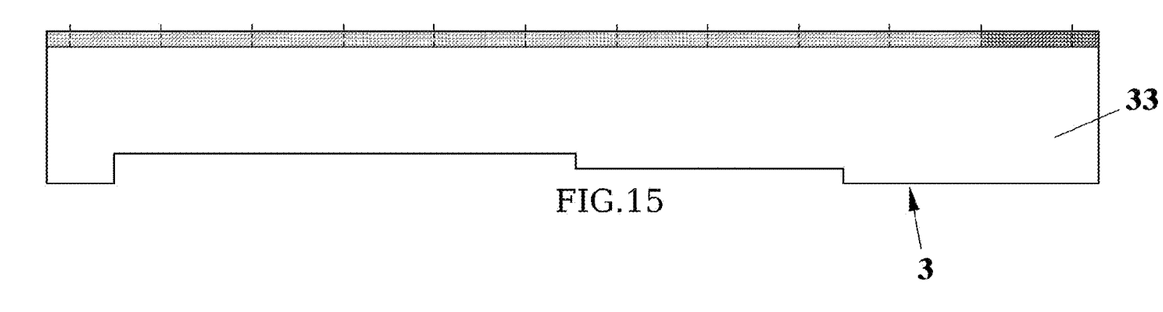
FIG. 15 shows a variable-height embodiment of the band.
Figure 16:
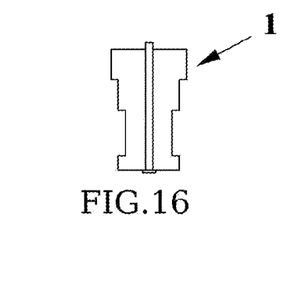
FIG. 16 is an elevation view that schematically shows the shape of the rotary brush fitted with the band in the previous figure.

FIG. 15 shows an embodiment of a variable-height band, while FIG. 16 schematically shows the shape of the rotary brush fitted with this band.

Figure 17:
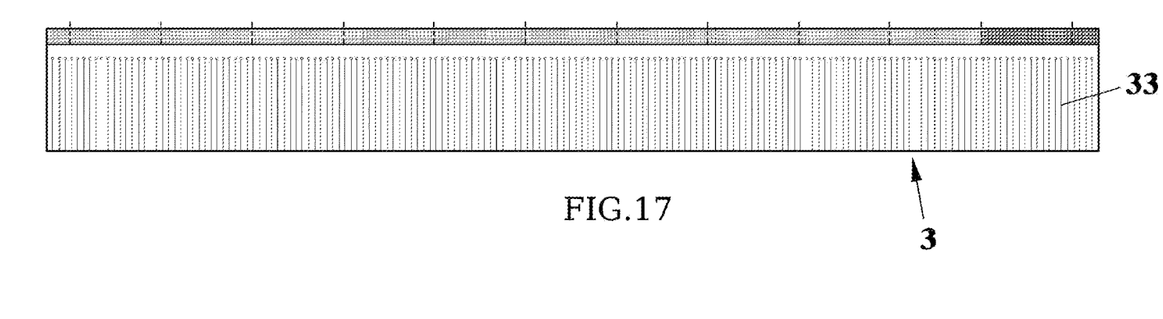
FIG. 17 shows a constant-height embodiment of the fringed band.
Figure 18:
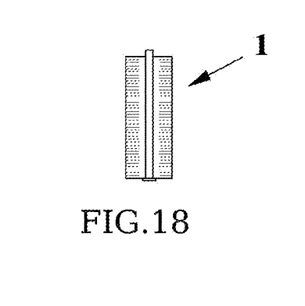
FIG. 18 is an elevation view that schematically shows the shape of the rotary brush fitted with the band in the previous figure.

FIG. 17 shows an embodiment of a constant-height fringed band, while FIG. 18 schematically shows the shape of the rotary brush fitted with this band.

Figure 19:
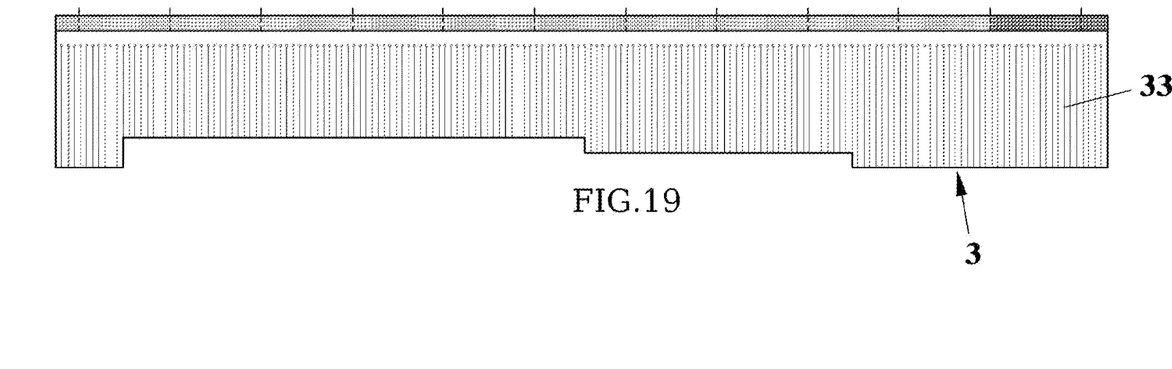
FIG. 19 shows a variable-height embodiment of the fringed band.
Figure 20:
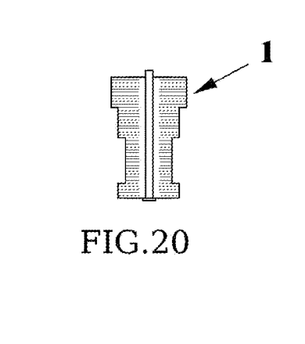
FIG. 20 is an elevation view that schematically shows the shape of the rotary brush fitted with the band in the previous figure.

FIG. 19 shows an embodiment of a variable-height fringed band, while FIG. 20 schematically shows the shape of the rotary brush fitted with this band.

Figure 21:
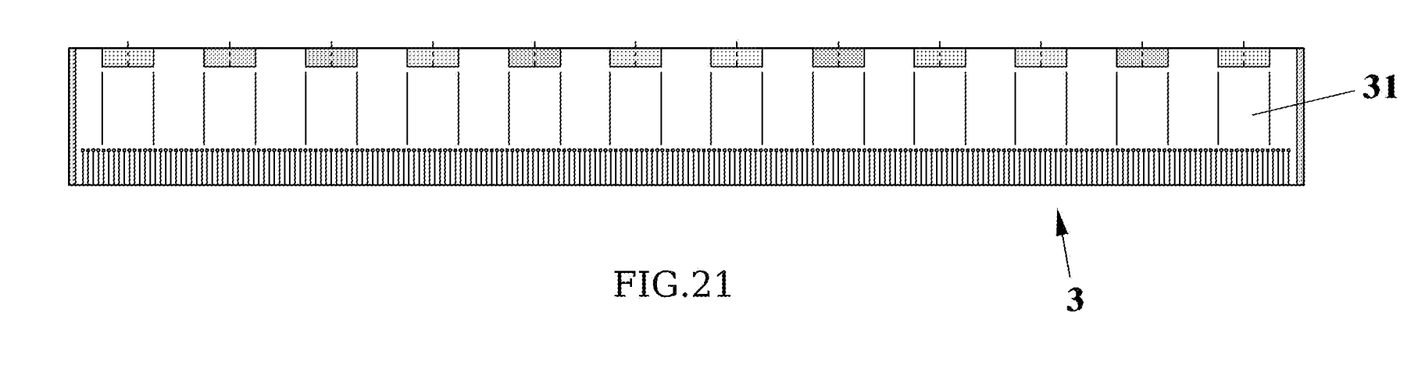
FIG. 21 shows an embodiment of a partially-fringed band.
Figure 22:
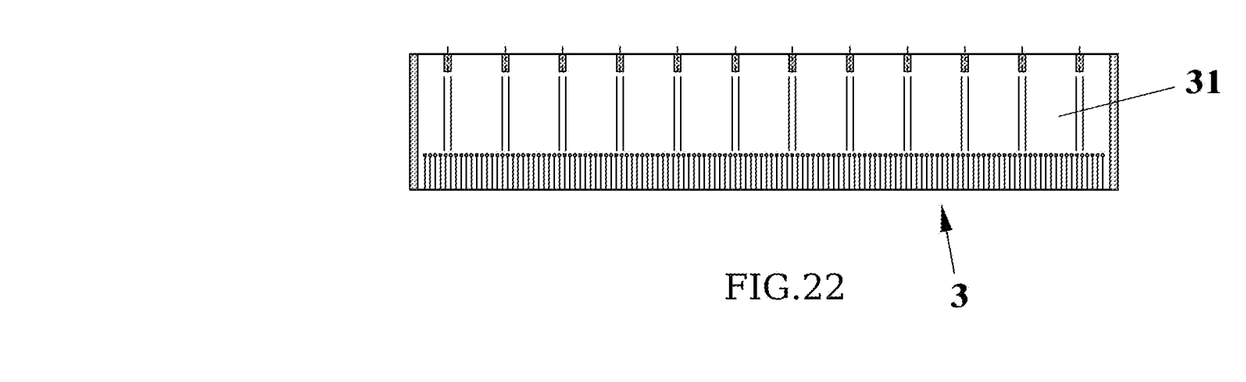
FIG. 22 shows the band in the previous figure in the folded state.

FIG. 21 shows an embodiment of a partially fringed band and FIG. 22 shows the same band in the folded state.

From the above disclosure it should be apparent that the invention fully achieves the intended aim and object.

A composite rotary brush has in fact been made that, thanks to the removable system of cleaning elements that can be coupled to a central unit, allows not having to disassemble the central unit from the rotating support when performing maintenance and/or cleaning operations on the cleaning elements.

The multiple configurations of the cleaning elements offer several advantages.

The brush according to the present invention is ecologically advantageous because it can be made using less material, both in the production phase and afterwards, for spare parts, and recyclable materials can be used.

The brush allows its production processes to be speeded up and offers logistical advantages due to the volume savings when shipping and the better packaging for the material.

The brush of the present invention is more efficient since the band system does not leave washing/drying "gaps" on surfaces.

This brush also offers advantages from the cleaning standpoint, since the system allows removing the part of the brush most exposed to dirt and wear, allowing a quick and easy cleaning or, if required, the total, rapid and simple replacement of all the cleaning elements, which is not possible with the brush structures of the known art.

The assembling of the brush is always simple and rapid, during the production phase, replacement, cleaning, etc.

Another advantage is constituted by the fact that brushes with infinite combinations of materials, thicknesses, densities and colours can be made, while keeping the central support unit of the cleaning elements unchanged.

As mentioned, this brush can be used for various applications: washing, polishing and drying of all types of surfaces, with the individual brushes installed vertically and/or horizontally, and without requiring complex modifications to the brush-carrier structures of existing automatic washing systems.

Obviously, the materials used, as well as the dimensions, can be of any type, according to needs.

The invention claimed is:

1. A rotary brush for automatic vehicle washing systems, said brush comprising a central unit (2) and a plurality of cleaning elements (3), operatively supported by and coupled to said central unit (2) through removable coupling means (7); said cleaning elements (3) being removable from said central unit (2) and may be replaced and/or removed without requiring the removal of said central unit from the rotary structure; said central unit (2) comprising a rigid shaft (4) that supports a plurality of supporting elements (5) comprising a plurality of lugs (53) to which the cleaning elements (3) are connected; said cleaning elements (3) comprising a plurality of bands (33), fringed and/or fringeless, helically arranged on said central unit (2) in such a way that each band (33) is coupled to a plurality of supporting elements (5); said removable coupling means (7) being selected from the group consisting of hook-and-loop fastener, zips, buttons, clips, hooks, pins, and combinations thereof.

2. A brush, according to claim 1, wherein said cleaning elements (3) comprise additional bands (31), fringed and/or fringeless, arranged in a ring-line manner on said central unit (2) in such a way that each band (31) of said additional bands arranged in a ring-line manner is integrally supported by a single supporting element (5).

3. A brush, according to claim 2, wherein said cleaning elements (3) comprise flag elements, fringed and fringeless, individually arranged on each said lug (53) of said central unit (2) in such a way that each supporting element (5) supports a plurality of said additional bands (31) arranged in a ring-line manner on said central unit (2).

4. A brush, according to claim 1, wherein each said supporting element (5) comprises a clamping ring (52) and a plurality of lugs (53), undulated and/or not undulated, adapted to support said cleaning elements (3).

5. A brush, according to claim 1, wherein said cleaning elements (3) are associated with said lugs (53) through removable coupling means (7).

6. A brush, according to claim 1, wherein said cleaning elements (3) are made of materials selected from expanded or non-expanded materials, closed or not closed-cell materials, felt, fabric, microfiber, laminated and coupled materials, or any other materials adapted to perform washing/drying operations of motor vehicles, and which can be assembled separately or intermixed with one another.

7. A brush, according to claim 1, wherein said supporting elements are integrally moulded from a rigid plastic material.

* * * * *